(No Model.)  2 Sheets—Sheet 1.
E. T. & E. E. STARR.
SECONDARY OR STORAGE BATTERY.
No. 323,890.  Patented Aug. 4, 1885.
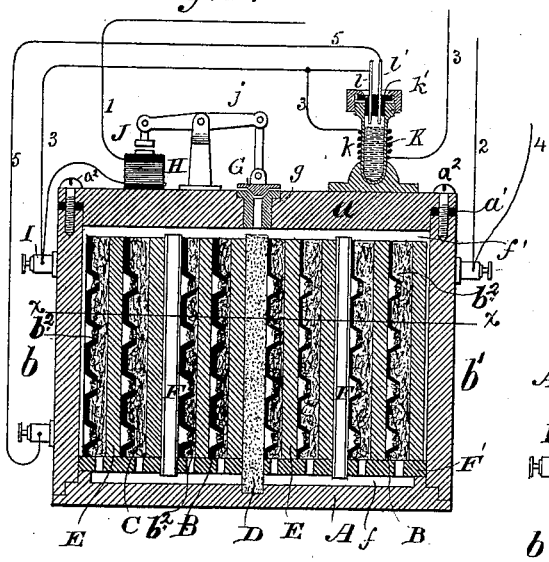
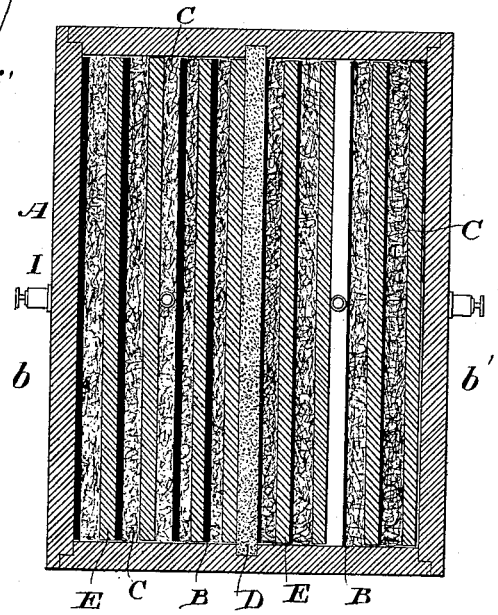
WITNESSES
INVENTORS.
Eli T. Starr,
E. Eugene Starr,
By their Attorneys
Baldwin, Hopkins & Peyton.

(No Model.) 2 Sheets—Sheet 2.
E. T. & E. E. STARR.
SECONDARY OR STORAGE BATTERY.
No. 323,890. Patented Aug. 4, 1885.
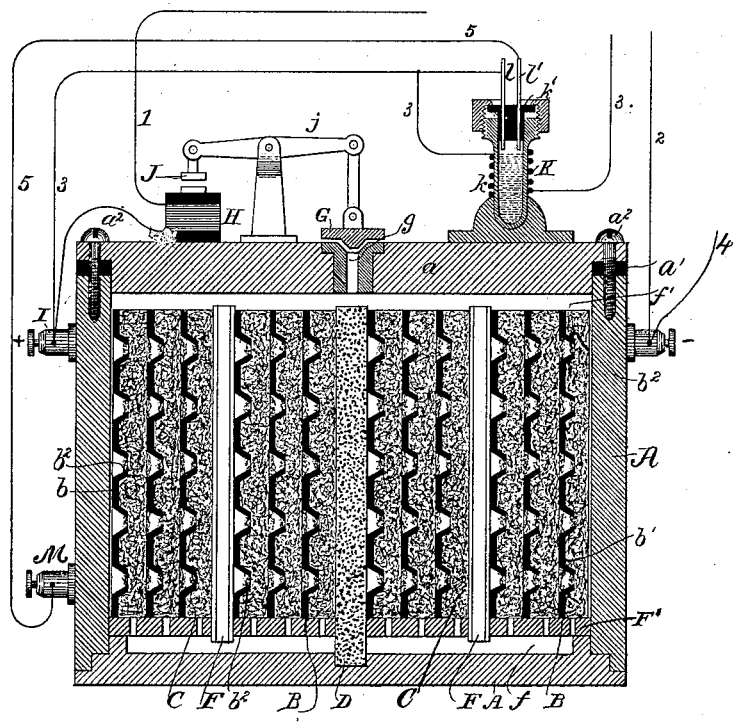
WITNESSES:
Wm A. Skinkle
Wm Messer
INVENTORS:
Eli T. Starr,
E. Eugene Starr,
By their Attorneys
Baldwin, Hopkins & Peyton

UNITED STATES PATENT OFFICE.

ELI T. STARR AND E. EUGENE STARR, OF PHILADELPHIA, PENNSYLVANIA, ASSIGNORS TO THE STARR ELECTRIC STORAGE COMPANY, OF CAMDEN, NEW JERSEY.

SECONDARY OR STORAGE BATTERY.

SPECIFICATION forming part of Letters Patent No. 323,890, dated August 4, 1885.

Application filed December 31, 1881. (No model.)

*To all whom it may concern:*

Be it known that we, ELI T. STARR and E. EUGENE STARR, both of the city and county of Philadelphia, in the State of Pennsylvania, have jointly invented certain new and useful Improvements in Secondary or Storage Batteries, of which the following is a specification.

Our invention relates to the class of batteries for producing or generating electricity known as "secondary" or "storage" batteries. These batteries are charged or put into condition for generating electric currents by the action of a current of electricity evolved by a generator and caused to flow through the battery, the work of the charging-current being recovered when desired by connecting the electrodes of the battery by an electric conductor.

The object of our present invention is to provide an improved secondary or storage battery, and to render more economical, certain, and effective the results sought to be accomplished by such batteries.

The subject-matter claimed is particularly pointed out at the close of the specification.

In the accompanying drawings, which show our several improvements as embodied in the best way now known to us, Figure 1 is a vertical central section through the improved secondary or storage battery, and Fig. 2 is a horizontal section therethrough on the line $x\ x$ of Fig. 1. Fig. 3 is a similar sectional view to that of Fig. 1 through the battery, showing the compound electrodes as separated by a porous partition or diaphragm, and said electrodes without the interposed felt or other material between the parts of said electrodes, which is shown in Fig. 1, in addition to the aforesaid porous partition.

The body of the vessel or box A of the battery is constructed preferably of the oblong rectangular shape shown in the drawings, and of material which is a non-conductor of electricity, such as glass, hard rubber, or gutta-percha. When the vessel A is so constructed, we preferably strengthen it by a surrounding casing or envelope of some stout material in order to give support to the vessel and protect it during transportation. The open end or top of the vessel A is provided with a closely-fitting non-conducting lid or cover, $a$, and between the edges of said vessel and said lid or cover we interpose a packing material, $a'$. The lid or cover is fastened securely and tightly in place, so as to make the chamber of the vessel or box air-tight, and this is done by means of suitable fastening devices, shown as consisting in this example of screws $a^2$ passing down through the lid or cover into the walls or sides of the body of the vessel. By making the battery-vessel air-tight greater ease and safety in handling is permitted among other advantages.

Within the preferably liquid or air-tight chamber of the vessel or box are arranged the positive and negative elements or electrodes of the battery, together with the substance (an electrolytic fluid, usually acidulated water) to be acted upon by the charging-current in order to place the battery in condition to generate electricity when the poles or electrodes of the battery are connected in circuit by a conductor.

The electrodes preferably consist of lead plates B, the positive and negative plates being preferably respectively of different thickness or size; or the positive and negative plates may be of different metal—as, for example, the positive plates may be of lead and the negative plates of palladium. We prefer to construct the positive plates—that is, the plates connected with the positive (+) pole of the charging-generator—of greater thickness than the negative plates, in order to enable the positive plates to withstand the contortions or changes of shape they are especially liable to undergo during the "formation" of the battery. The increased durability and strength of the positive plates may be imparted to them in various ways.

The plates B in both the positive and negative series we prefer to be in the form of sieves, or with holes or depressions made therein. If thin plates are used as the electrodes, they may be indented or depressed by a pointed tool, so as merely to stretch the metal without completely perforating it. We prefer, however, this sieve or perforated form of plate, as it affords greater surface to receive the material with which the plate is coated or supplied, and which is to be affected by the charging-current through the decomposition of the electrolytic liquid of the cell. We prefer also to provide the battery-plates with recesses or receptacles for the reception of the aforesaid material, which is usually porous when active, and these recesses are clearly shown in the drawings, being formed by the walls of the projections $b^2$, through which the openings or perforations of the plate are made. By means of said recesses between the perforated projections, the porous active material is more securely held to and supported upon the plate, and a larger amount of said material may be applied to the plate to be effectively acted upon or affected by the charging current than if the plate had plain sides or was simply perforated, which construction is highly advantageous, in that it secures greater capacity with the same weight of battery for the accumulation or storage of the energy of the charging-current. This porous material, or material to be made porous or active, may be red oxide of lead, peroxide of lead, sulphate of lead, peroxide of manganese, or any equivalent thereof, moistened with dilute sulphuric acid, or with a salt in solution, (which does not chemically affect the oxides,) or any equivalent thereof, in order to form a paste. This paste, so prepared, or the equivalent thereof, is or may be thoroughly mixed or incorporated with fibers or fibrous material—such as raw cotton, for example—and is then spread upon the plates B in layers C, the thickness of which relatively to the thickness of the metal plates may be about as shown in the drawings, but the proportion may of course be varied. The fibers, by reason of their mixture with the oxide, or its equivalent, become virtually conductors throughout the entire layer of the oxide, whereby it will be evident that a largely-increased surface of the oxide is presented to the action of the charging-current, and greater surface is afforded for the accumulation of the energy of the charging-current.

Not only does the fiber act in the highly beneficial manner indicated, but it enables a secondary battery of large capacity to be produced without too great weight; and it also acts to bind together the mass composing the active porous material, and also to make it cling or adhere to the plate, which are important features.

The positive and negative series of plates, respectively marked $b$ and $b'$, with their oxide or its equivalent, each constitute a compound battery plate or element, and are or may be separated by a porous partition or plate, D, to constitute a resistance medium, as shown in Figs. 1, 2, and 3; or, in place thereof, a layer of felt, E, or some equivalent thereof, may be interposed between one side of each plate B of the compound positive and negative electrodes and their layers of oxide or oxide and fiber, as shown in Figs. 1 and 2. In said Figs. 1 and 2, for the sake of convenience, we have shown the battery as provided with both the porous partition D and with the felt or equivalent material E, but in Fig. 3 the porous plate or partition alone is shown.

It will be seen that each electrode in the example shown is made up of a mass of finely-divided or porous active material held and supported at its sides between the plates B, which plates are not solid, but, on the contrary, permit ready access through them of the electrolytic fluid, and also permit the ready action of the accumulating forces upon the active material.

The edges of the active mass in the example shown are supported by the non-conducting sides of the battery-vessel and by the non-conducting frame or floor F', hereinafter described, and such a method of supporting the mass as we have described—to wit, at its side by open plate and at its edges by a non-conducting support—is in some cases preferable.

Through each mass, making up the positive and negative electrodes or elements, we preferably insert a non-conducting tube, F, which may be of glass or hard rubber; or, in place of the tube, non-conducting strips may be used to separate each mass, the prime object of which is to carry off or give comparatively free vent or escape to the surplus gases generated in the battery by the action of the charging-current, which gases, if not removed, prevent the ready accumulation of the energy of said current.

At the lower end of the vessel A, above its bottom, is inserted a perforated plate or frame, F', which constitutes a partition or floor upon which the interior parts of the battery rest. A space, $f$, is thus formed between said floor and the bottom of the vessel for a portion of the electrolytic fluid of the battery, and for the free collection and upward escape of the surplus gases unopposed by solid matter; and a like space, $f'$, is formed at the top of the battery, between the conducting plates and oxide and the cover of the battery, for a similar purpose. The spaces or tubes F afford free communication between the top and bottom spaces, $f f'$, of the battery, and the surplus gases from below thus readily escape upward through the liquid of the battery and collect in the top space and escape through a valve-opening, $g$, in the lid or cover when the valve G is raised from its seat or opened. Said valve G is automatically operated by the action of the charging-current, said current opening the valve to permit of the escape of the surplus gases which are generated during the charging of the battery, while the valve is automatically closed when the charging-current is cut off or ceases to flow to the battery.

The charging-current flows from the generator or source of electricity to the battery through a line-wire, 1, which passes around a soft-iron core mounted on the top of the battery-cover to form an electro-magnet, H, and is then connected to a binding-screw, I. Said binding-screw is electrically connected with the series of plates, constituting the compound positive electrode or element of the storage-battery. The charging-current thus passes through the positive and negative plates, and their layers C of oxide and fiber, or its equivalent, and through the electrolytic fluid, or a portion thereof, and causes the chemical action which results in the storage or accumulation of energy by, it is believed, converting the positive pole or electrode into an oxygen element and the negative pole or electrode into a hydrogen element, and said current then returns to the generator by way of wire 2, which is connected to a suitable binding-post connected with the series of plates constituting the compound negative electrode of the battery.

It is evident that as soon as the charging-current begins to flow to the storage-battery the armature J of the electro-magnet H will be attracted, and the valve G opened by means of the pivoted beam $i$, while as soon as the current is cut off the valve will be automatically closed by its weight, which is greater than that of the armature J. If desired, a spring may aid in the retraction of the armature in a common manner to return the valve to its seat to close the vent-opening $g$. As soon as the battery is sufficiently charged, the connection with the generator is cut off.

When it is desired to generate a current of electricity by the storage-battery, its electrodes are connected by a conductor. A wire, 3, is shown in this example as leading from the positive (+) electrode of the battery to conduct the current, and said wire is connected with a resistance coil, $k$, wound about a glass vial or cup, K, mounted on the cover of the vessel A, said resistance-coil constituting a part of the circuit. The wire 3 then passes to the point at which the current of the battery is to do its work, and returns by way of wire 4 to the negative (−) pole of the battery.

The cup or vial K is partially filled with mercury, and is provided with a non-conducting cap or stopper, $k'$, through which is passed two adjustable conducting pins or screws, $l\ l'$, the lower ends of which extend to within a short distance of the mercury when no current is flowing from the battery. The wire 3 of the battery is connected to the screw $l$, while the screw $l'$ is connected with a wire, 5, leading, for example, to the binding-screw M, which is electrically connected with the bottom of the plates constituting the positive electrode of the storage battery.

By this organization a governor is provided for the current generated by the battery, so as to regulate the quantity of electricity to be used. If the battery is furnishing current, it will first flow through the wire 3, resistance-coil $k$ in said wire, and return by way of wire 4. Should, however, the current flowing through the circuit be too great, as determined by the adjustment of the pins or screws $l\ l'$, it will heat the resistance coil $k$ and cause the mercury column to rise and close the circuit through the wire 3, pins $l\ l'$, and wire 5, so that any excess of current will be returned to the battery or otherwise conducted off.

When the current does not exceed the strength or volume required, it will not heat the resistance-coil sufficiently to cause the mercury to rise and make a branch circuit through the pins $l\ l'$, whereby the current flows through its main circuit only.

The governor herein shown and described is of the sole invention of Eli T. Starr, and constitutes the subject-matter of application for Letters Patent heretofore made by him. We therefore do not claim such a governor *per se* as our joint invention.

We are aware that the porous active material applied to the plates of secondary batteries has been made up of oxide of lead or its equivalent, mixed with an inert substance—such as pulverized coke or sawdust—but such inert substance does not have a binding action upon the mass like that of the fiber or filaments used by us. This mixture, however, of oxide of lead or its equivalent with fiber or filaments is not claimed herein, as it has been patented to us under date of November 28, 1882, upon an application filed as a division of this present case. All matter not patented upon this original application or upon divisions thereof already filed is reserved as the subject-matter of other divisional applications to be hereafter filed by us; and this reservation is not affected by the making and cancellation of any claim or claims either in this original case or in any of the divisions thereof.

We claim as our joint invention and desire to secure by Letters Patent—

1. In a secondary battery, a compound element or electrode having two or more perforated plates, and porous active material interposed between said plates, substantially as described, whereby the plates securely retain the active material between them, while the perforations of said plates facilitate the accumulating action of the battery by permitting ready access to the active material.

2. An electrode for secondary batteries, having one or more receptacles wherein the active material is placed, and provided with holes or perforations in the walls of said receptacles, substantially as described.

3. In a secondary battery, a perforated battery-plate having formed therein, in addition to its perforations, receptacles or recesses for the reception of active material, and having active material placed in said recesses, substantially as described.

4. A compound element for secondary batteries, having a mass of finely-divided active material supported at its sides between two or more open plates or supports, substantially as described, (in contradistinction to finely-divided active material applied to the sides of a solid or non-porous plate and held thereon by sheets of felt or cloth,) whereby the battery-fluid may penetrate through or saturate the active mass from side to side without meeting solid obstruction, substantially as described.

In testimony whereof we have hereunto subscribed our names this 27th day of December, A. D. 1881.

ELI T. STARR.
E. EUGENE STARR.

Witnesses:
WM. J. PEYTON,
JOHN URIAN.